United States Patent
Morgan

(10) Patent No.: US 7,178,136 B2
(45) Date of Patent: Feb. 13, 2007

(54) DEBUGGING STEP-BACK BUTTON

(75) Inventor: Fabian F. Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 10/610,187

(22) Filed: Jun. 30, 2003

(65) Prior Publication Data
US 2004/0268310 A1    Dec. 30, 2004

(51) Int. Cl.
G06F 9/44      (2006.01)
G06F 11/00     (2006.01)

(52) U.S. Cl. .................. 717/129; 717/124; 714/48
(58) Field of Classification Search ........ 717/124–135; 714/10, 15, 48; 706/45; 712/244
See application file for complete search history.

(56) References Cited

U.S. PATENT DOCUMENTS

| 5,140,671 A | * | 8/1992 | Hayes et al. ........... 395/76 |
| 5,170,464 A | * | 12/1992 | Hayes et al. ........... 395/76 |
| 5,428,618 A | | 6/1995 | Euki et al. ........... 371/19 |
| 5,687,375 A | | 11/1997 | Schwiegelshohn ...... 395/704 |
| 5,870,607 A | * | 2/1999 | Netzer ............... 717/127 |
| 5,946,488 A | | 8/1999 | Tanguay et al. ....... 395/705 |
| 6,161,196 A | * | 12/2000 | Tsai ................. 714/10 |
| 6,704,862 B1 | * | 3/2004 | Chaudhry et al. ...... 712/244 |

* cited by examiner

Primary Examiner—Kakali Chaki
Assistant Examiner—Trenton Roche
(74) Attorney, Agent, or Firm—David A. Mims, Jr.; Rudolf O. Siegesmund Gordon & Rees, LLP

(57) ABSTRACT

An improved apparatus and method for debugging computer programs is disclosed for enabling a programmer to step backwards through instructions by checking for exceptions, remembering which instruction generates an exception, and for providing an interface that allows the programmer to easily step back through the instructions in order to isolate the cause of the exception, without the undue repetition.

20 Claims, 2 Drawing Sheets

DEBUGGING STEP-BACK BUTTON

FIELD OF THE INVENTION

The present invention relates generally to an apparatus and method for debugging computer programs, and specifically to a step-back command that allows a programmer to use a debugger to recall and display an instruction that generated an exception.

BACKGROUND OF THE INVENTION

Computer programs consist of instructions that tell a computer how to operate. Usually, computer programs also provide a means for people to interact with the computer. The means for interaction can be achieved in several ways. The most common means are through the use of input data and interactive commands that the computer has been programmed to accept. Although a program may be as small as a single instruction, programs today typically consist of hundreds, thousands, or even millions of instructions. The order that instructions are executed depends on many things, including any input data provided to the program, or interactive commands given to the program.

Today, a computer programmer uses several types of existing computer programs to build and test new computer programs. In particular, a programmer typically uses an editor program to write instructions and a debugger program to test the instructions.

An editor is the computerized equivalent of a typewriter page. A programmer uses a keyboard to type instructions, and the editor displays the instructions as text on the computer screen. Each line of text that is created with an editor usually represents a single instruction. To make larger programs more manageable, it is common practice for programmers to group related instructions into separate modules, such as functions or subroutines. These modules can then be referenced and used in the program with a single instruction.

As the number of instructions increase, though, so does the probability of errors occurring in the program. Programs may contain many kinds of errors, including syntax errors and logical errors.

A syntax error in a program is analogous to a misspelled word or a grammatical mistake in a book. But unlike a person, a computer cannot guess what word the programmer intended to use. For this reason syntax errors usually, but not always, must be found and corrected, using an editor, before a program will execute any of its instructions.

Logical errors, on the other hand, are latent design defects that are usually uncovered only through extensive testing and use of the program. A programmer usually tests a program by executing the program and observing the behavior and results. Logical errors generally cause the computer to execute instructions in an unexpected way, or to produce incorrect results.

Finding and correcting errors in large programs can be a tedious and time-consuming process. Programmers have developed several methods to address this problem. In the most basic method, a programmer attempts to remove errors from the program by identifying and correcting the instruction, or instructions, that cause them. The easiest way to identify the source of an error is to execute one instruction at a time and observe the order of execution and intermediate results. Ordinarily, though, a program does not display its instructions as they are executed, nor does the program stop execution after every instruction. A separate program called a debugger must be used to interactively control execution of a program and display instructions to a programmer as they are executed.

A debugger performs many functions. First, a programmer uses a debugger to mark breakpoints in instructions. Second, a programmer uses a debugger to execute instructions in a program. A debugger executes a program's instructions, as they would normally execute, until the debugger encounters an instruction marked with a breakpoint. A breakpoint causes a debugger to halt execution of instructions. Once a debugger halts execution, a programmer can examine a program's state. A program's state includes the value of any data or variables that the program uses during execution. A programmer can also interactively control subsequent program execution once a debugger has halted execution. Subsequent execution is controlled by giving commands to the debugger. For example, a step command causes the debugger to execute the next instruction and halt execution again. A resume command causes the debugger to execute all remaining instructions unless another breakpoint is encountered. When stepping through a program one instruction at a time, though, a programmer will typically encounter an instruction that references and uses a separate module. A programmer may use a debugger to step into or step over a module. If a programmer steps into a module, the debugger executes and displays the first instruction in that module and then halts execution. Once inside a module, a programmer can examine the module's instructions and control execution just the same as outside the module. On the other hand, if a programmer steps over a module, a debugger executes all instructions inside that module without displaying them. The debugger then halts execution at the first instruction following that module. Once the programmer identifies an error using this technique of stepping through a program, the programmer can then use an editor to correct the instruction, or instructions, causing the error.

Ideally, all errors would be eliminated from the program by using the method discussed above, and there would be no need for additional methods of handling errors. But those skilled in the art will appreciate that this aspiration is not usually met. Consequently, a programmer usually also includes error-checking instructions and error-handling instructions in the program itself. These error-checking and error-handling instructions are written with an editor and incorporated into a program just the same as any other instruction. Error-checking and error-handling instructions are also executed just like any other instruction. Typically, error-checking instructions are dispersed throughout the rest of the instructions, wherever the programmer thinks such instructions are appropriate. Error-checking instructions, though, are often grouped together in a convenient location within the program. A program may contain several groups of error-checking instructions.

Error-checking instructions check program behavior and intermediate results as the program is executing. If unexpected behavior or incorrect results are encountered, the error-checking instructions generate an exception. An exception is a signal to the computer to find and execute an appropriate error-handling instruction. An exception usually includes general information about the nature of the unexpected behavior or incorrect results. For example, an exception may indicate that an instruction attempted to divide a number by zero. An error-handling instruction typically interprets an exception, gives the user a warning message consistent with the exception, and terminates program execution. This second method of using error-checking and error-handling instructions is generally used in conjunction with the first method, and one method is not usually considered a substitute for the other.

While these methods are useful, there is still much room for improvement in the art. One common problem is presented when a programmer uses a debugger to control and examine the instructions in a program. A programmer may assume that an error is in a complex series of instructions and execute other instructions without examining them. Or the programmer may simply step over modules containing many other instructions. If an error happens to be in an instruction that was unexamined or in a module that was stepped over, a programmer must usually start the process all over again. Sometimes, this process must be repeated several times to find a single error. The result is lost time and productivity.

The result is the same even if a program includes error-checking instructions, and the error-checking instructions recognize an error. Because error-checking instructions are simply part of the program itself, a debugger treats them no differently than other instructions. Sometimes the only indication that an error-checking instruction has found an error is that the next instruction executed is an error-handling instruction. Again, the programmer usually has no choice but to start the process all over again.

The underlying problem with these methods is that a debugger usually does not allow a programmer to step backwards through instructions, and consequently must start over every time a programmer needs to review previously executed instructions. U.S. Pat. No. 5,428,618 (the '618 patent) entitled "Debugger Apparatus and Method Having an Event History Recording Capability" discloses the use of an execution history file to reproduce program behavior. But the method and apparatus disclosed in the '618 patent require additional files and programs to enable a programmer to step backwards through instructions while trying to identify errors in programs. Therefore, a need exists in the art for a method and apparatus for stepping backwards through instructions without the added cost and overhead of using additional files and programs. Such an apparatus would drastically reduce or eliminate the need to engage in the tedious and time-consuming repetition that is so commonly required with currently available methods.

SUMMARY OF THE INVENTION

The present invention comprises an improved debugger having a step-back command. The step-back command allows a programmer to readily step backwards through instructions in order to identify errors in a program. The step-back command can be added to any standard debugger. This invention takes advantage of error-checking instructions that a programmer commonly includes in a program. An error-checking instruction generates an exception when an error is recognized. The invention intercepts the exception and identifies the instruction that generated it. The invention also identifies the program's state at the time the exception was generated. After intercepting the exception, the invention passes the exception back to the program so that the program's execution can resume as if the exception had not been intercepted. The step-back command then allows a programmer to use a debugger to recall and display the instruction that generated the exception.

DETAILED DESCRIPTION OF THE PREFERRED EMBODIMENT

"Computer" means a machine having a processor, a memory, and an operating system, capable of interaction with a user or other computer, and shall include without limitation desktop computers, notebook computers, personal digital assistants (PDAs), servers, handheld computers, and similar devices.

"Debugger," means any computer program that enables a programmer to control execution and display instructions of another computer program.

"Input device" means a device for entering information into a smartcard or a computer and shall include without limitation a keyboard, mouse, trackball, touchpad, touch-point device, stylus pen, and touch screen.

"Output device" means a device for displaying data and shall include without limitation cathode ray tubes (CRT), liquid crystal display (LCD) and printers.

"Persistent storage" means any medium that enables data to exist between periods of use and may include, without limitation, any magnetic or optical storage device, or any type of database.

"Target program" means a program whose execution is subject to the control of a debugger, and whose instructions are displayed by a debugger.

"Workstation" means any network terminal, or any other type of computer whether connected to a network or not.

In the preferred embodiment of the invention, a programmer interacts with the improved debugger through a graphical user interface (GUI). A person of ordinary skill in the art will be familiar with the various types of GUIs commonly used, including graphical window systems. In such a graphical window system, the step-back command would be controlled through either a menu command or a graphical button. Selecting the command or clicking the button would cause the debugger to display the instruction of the target program that generated the exception. The step-back command would also cause the debugger to reset the target program's state to match the state existing when the exception was generated.

In an alternate embodiment, the invention would also keep track of exceptions by storing the location of any instructions that generate exceptions, and also keep track of a target program's state as it changes with each executed instruction. This embodiment would allow a programmer to repeatedly step back through executed instructions if necessary, in order to identify the underlying cause of an exception.

A person reasonably skilled in the art will appreciate that this invention could be implemented in many configurations, including a networked, distributed data processing system or a simple, stand-alone computer. The foregoing and other objects, features, and advantages of the invention will be apparent from the following more particular description of the preferred embodiment of the invention, as illustrated in the accompanying drawings wherein like reference numbers represent like parts of the invention.

Figure 1:
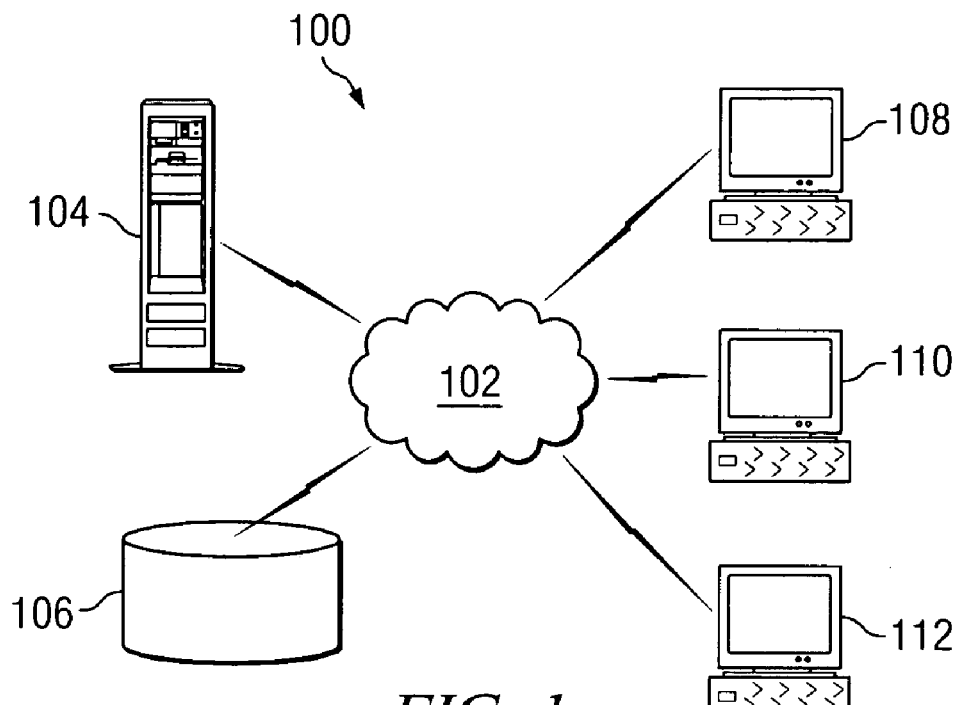
FIG. 1 is a depiction of a typical networked computing environment in which the step-back command could be implemented.

FIG. 1 is an illustration of computer network 100 associated with the present invention. Computer network 100 comprises local workstation 108 electrically coupled to network connection 102. Local workstation 108 is electrically coupled to remote workstation 110 and remote workstation 112 via network connection 102. Local workstation 108 is also electrically coupled to server 104 and persistent storage 106 via network connection 102. Network connection 102 may be a simplified local area network (LAN) or may be a larger network such as a wide area network (WAN) or the Internet. Furthermore, computer network 100 depicted in FIG. 1 is intended as a representation of a possible operating network that may contain the present invention and is not meant as an architectural limitation.

Figure 2:
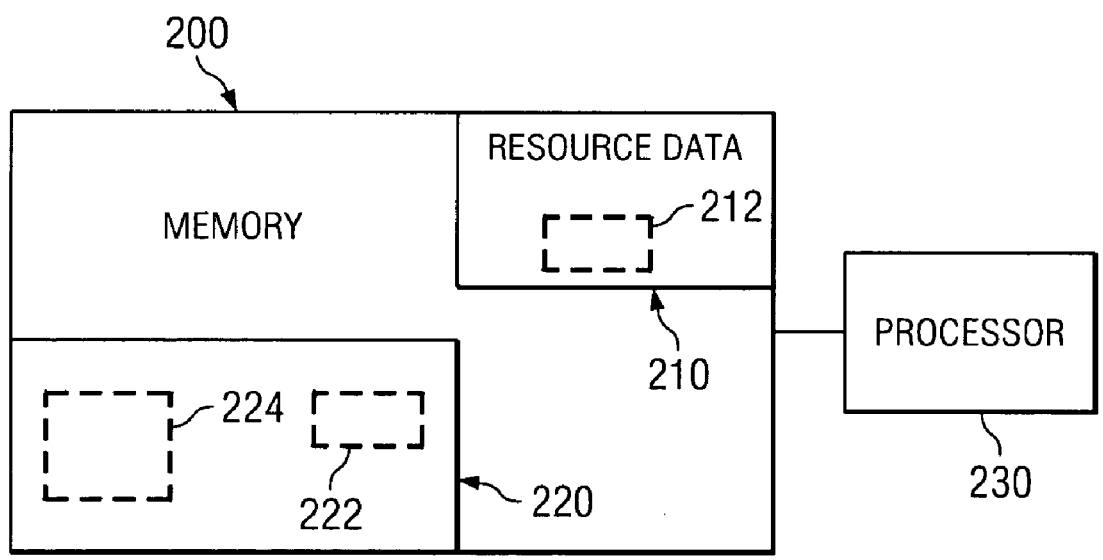
FIG. 2 represents the memory configuration of a typical computing workstation using the step-back command.

The internal configuration of a computer, including connection and orientation of the processor, memory, and input/output devices, is well known in the art. The present invention is a methodology that can be embodied in a computer program. Referring to FIG. 2, the methodology of the present invention is implemented in debugger 220, which resides in memory 200. Debugger 220 controls target program 224 execution and includes step-back button 222. Debugger 220, target program 224, and step-back button 222 described herein can be stored within memory 200 of any workstation or server depicted in FIG. 1. Alternatively, debugger 220, target program 224, and step-back button 222 can be stored in an external storage device such as persistent storage 106, or a removable disk such as a CD-ROM (not pictured). Memory 200 is only illustrative of memory within one of the machines depicted in FIG. 1 and is not meant as a limitation. Memory 200 also contains resource data 210, which includes stack data 212. The present invention may interface with resource data 210 through memory 200. Memory 200 is connected to processor 230.

In alternative embodiments, debugger 220 and/or target program 224 can be stored in the memory of other computers. Storing debugger 220 and/or target program 224 in the memory of other computers allows the processor workload to be distributed across a plurality of processors instead of a single processor. Further configurations of debugger 220 and target program 224 across various multiple memories and processors are known by persons skilled in the art.

Figure 3:
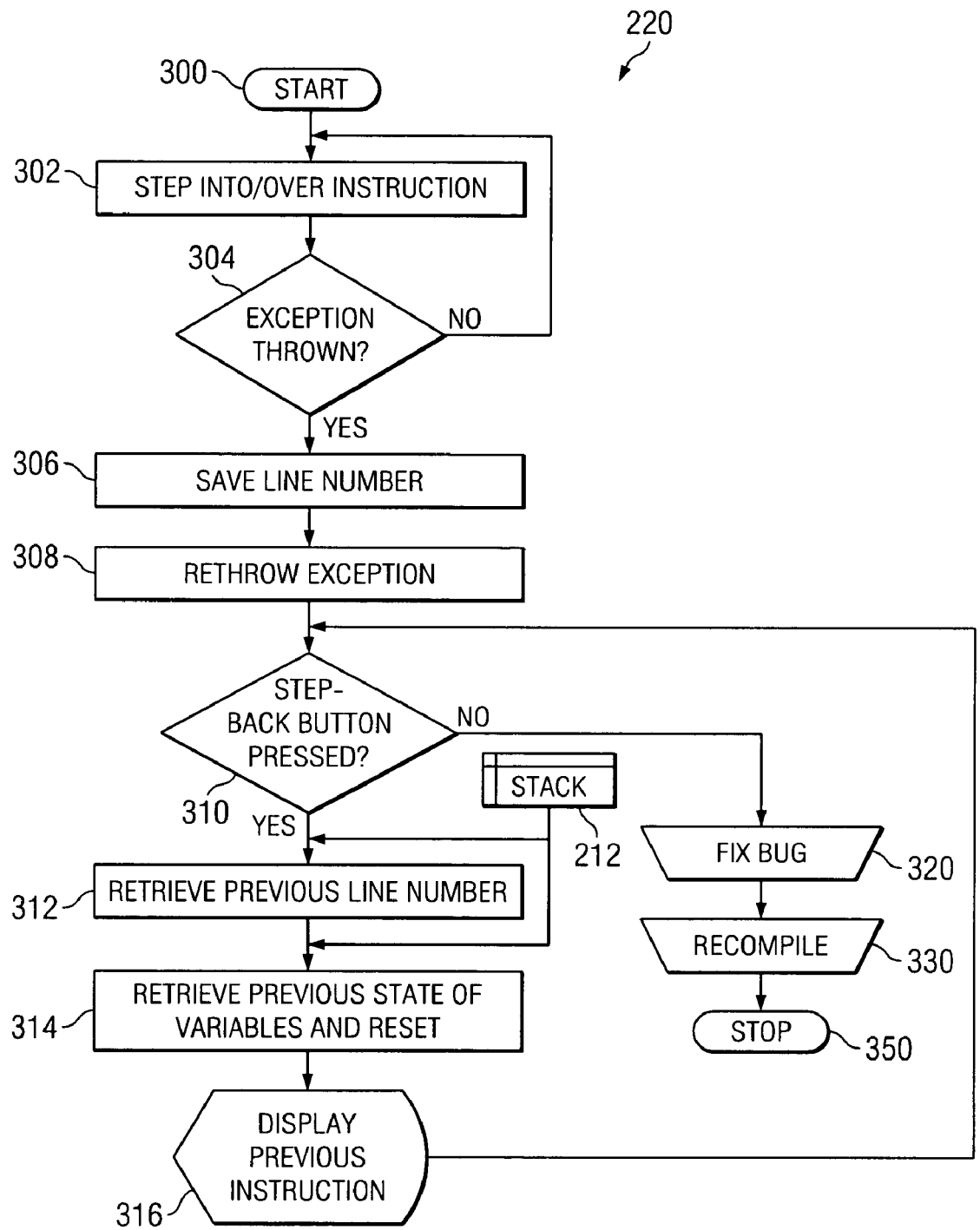
FIG. 3 is a flowchart of the logic of the present invention.

Turning to FIG. 3, a flowchart of the logic of the invention is illustrated. Debugger 220 starts (300) and initiates target program 224 execution. Target program 224 execution continues until a breakpoint is reached or the programmer otherwise causes execution of target program 224 to halt. Once execution is halted, the programmer may instruct debugger 220 to step into or over the next instruction (302) in target program 224, or alternatively, resume execution until the next breakpoint is encountered. Debugger 220 internally manages stack 212 so that it contains, at a minimum, the last executed instruction of target program 224, the current state of variables in target program 224, and the line number of the last executed instruction of target program 224. As each instruction in target program 224 is executed, debugger 220 determines whether the instruction has generated an exception (304). If no exception has been generated, debugger 220 continues by stepping into or over the next instruction as directed by the programmer. But if an exception is generated, debugger 220 intercepts it, saves the line number of the instruction (306) that generated it to stack 212, and re-generates the exception (308) so that target program 224 can resume execution.

When target program 224 execution resumes, execution transfers to an appropriate error-handling instruction, which alerts the programmer that the exception has been generated. The programmer then clicks (310) step-back button 222, and debugger 220 retrieves the line number of the instruction that generated the exception (312) and the previous state of the program variables (314) from stack 212. Debugger 220 then resets the state of target program 224 to its previous state and displays the instruction that generated the exception (316). If the programmer has found the error by a single use of step-back button 222, then the programmer fixes the error (320) and re-compiles (330) target program 224. Alternatively, the programmer could repeatedly press step-back button 222 to track down an underlying problem. For example, if the problem was caused by a null pointer exception because of a null argument passed in through a function or method, the developer would be able to step back through the instructions of target program 224 to discover why the argument was null in the calling function or functions. A person of ordinary skill in the art will appreciate that this process may be repeated as necessary to correct other errors in target program 224, but if all errors have been identified and corrected, then the programmer is finished and debugger 220 stops (350).

It will be understood from the foregoing that various modifications and changes may be made in the preferred embodiment of the present invention by those skilled in the art without departing from its true spirit. It is intended that this description is for illustrative purposes only and should not be construed in a limiting sense. The scope of the invention should be limited only by the language of the following claims.

What is claimed:

1. A method of identifying errors in a target program having an error-checking instruction, comprising:
   executing the error-checking instruction;
   saving a last executed error-checking instruction to a single data file;
   checking the last executed error-checking instruction to determine if an exception has been generated,
   responsive to determining that an exception has been generated, intercepting the exception with a debugger, and saving a location of an instruction that generated the exception in the single data file;
   passing the exception back to the target program so that a target program execution can resume as if the exception has not been intercepted; and
   responsive to receiving a step-back command from a user input device, recalling and displaying the instruction that generated the exception.

2. The method of claim 1 further comprising: resetting a current program state of the target program to match a program state of the target program when an exception was generated.

3. The method of claim 1 further comprising: saving the computer program's state when the exception was generated in the single data file.

4. The method of claim 1 further comprising: passing the exception back to the target program.

5. The method of claim 1 further comprising: displaying the error-checking instruction that generated the exception on a user output device.

6. The method of claim 1 further comprising: saving a line number and a program state for every instruction executed in the single data file.

7. The method of claim 5 wherein the output device is a graphical editor.

8. The method of claim 7 wherein the graphical editor has a command button that generates a step-back command when pressed by a user.

9. A programmable apparatus for identifying errors in a computer program, the apparatus comprising:
   a computer having a processor connected to a first memory and to a second memory;

a target program having a plurality of error-checking instructions in the first memory;

a debugger in the second memory;

wherein the processor is directed by the target program to execute one of said plurality of error-checking instructions;

save a last executed of said plurality of error-checking instructions to a single data file;

check the one of said plurality of error-checking instructions to determine if an exception has been generated; and wherein, responsive to an exception being generated by the one of said plurality of error-checking instructions in the target program, the processor is directed by the debugger to intercept the exception, save a location of an instruction that generated the exception to the single data file, and display the one of said error checking instructions that generated the exception at a user output device.

10. The programmable apparatus of claim 9 wherein responsive to intercepting the exception, the processor is directed to save a program state of the target program when the exception was generated to the single data file.

11. The programmable apparatus of claim 9, wherein responsive to saving a location of the error checking instruction that generated the exception and saving a program state of the target program when the exception was generated, the processor is directed by the debugger to pass the exception back to the target program.

12. The programmable apparatus of claim 11, wherein responsive to receiving a step-back command from a user input device, the processor is directed to reset a current program state of the target program to match the program state of the target program when the exception was generated.

13. The programmable apparatus of claim 12 wherein the processor is further directed to save a line number and a program state for every instruction executed to the single data file.

14. The apparatus of claim 9 wherein the user output device is a graphical editor.

15. The apparatus of claim 14 wherein the graphical editor has a command button that generates a step-back command when pressed by a user.

16. A computer readable memory for causing a computer to identify errors in a target program having an error-checking instruction, comprising:

a computer readable storage medium containing the target program;

the storage medium, so configured by the target program, causes the computer to execute an error-checking instruction, save a last executed error-checking instruction to a single data file, and check the error-checking instruction to determine if an exception has been generated;

a debugger stored in the storage medium, wherein the storage medium so configured by the debugger, responsive to an exception being generated by the target program, causes the computer to intercept the exception, save the location of an error-checking instruction that generated the exception in the single data file, save the computer program's state when the exception was generated in the single data file, pass the exception back to the computer program so that an execution of the computer program can resume, and display the error-checking instruction that generated the exception on a user output device.

17. The computer readable memory of claim 16 wherein the storage medium so configured by the debugger, responsive to receiving a step-back command from a user input device, causes the computer to reset the current program state to match the program state when the exception was generated.

18. The computer readable memory of claim 16 wherein the storage medium so configured by the debugger, causes the computer to save a line number and a program state for every instruction executed in the single data file.

19. The computer readable memory of claim 16 wherein the user output device is a graphical editor.

20. The computer readable memory of claim 19 wherein the graphical editor has a command button that generates a step-back command when pressed by a user.

* * * * *